US006407993B1

United States Patent
Moulsley

(10) Patent No.: US 6,407,993 B1
(45) Date of Patent: Jun. 18, 2002

(54) FLEXIBLE TWO-WAY TELECOMMUNICATION SYSTEM

(75) Inventor: Timothy J. Moulsley, Caterham (GB)

(73) Assignee: Koninklije Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/070,216

(22) Filed: Apr. 30, 1998

(30) Foreign Application Priority Data

May 8, 1997 (GB) .............................. 9709285

(51) Int. Cl.[7] .......................... H04B 7/212; H04B 7/216
(52) U.S. Cl. ...................... 370/347; 370/332; 370/335; 370/337; 370/349; 455/436; 455/450
(58) Field of Search ................. 370/277, 280, 370/294, 311, 320, 321, 329, 331, 332, 333, 335, 337, 342, 347, 349, 389, 441, 442, 465, 466; 455/432, 436, 450, 451, 452, 509, 517, 522; 375/131

(56) References Cited

U.S. PATENT DOCUMENTS

| 5,481,533 | A | * | 1/1996 | Honig et al. ................. 370/335 |
| 5,546,411 | A | * | 8/1996 | Leitch et al. ................. 371/5.5 |
| 5,566,168 | A | * | 10/1996 | Dent ........................... 370/330 |
| 5,737,365 | A | * | 4/1998 | Gilbert et al. ............... 375/224 |
| 5,757,810 | A | * | 5/1998 | Fall ............................. 371/5.1 |
| 5,806,007 | A | * | 9/1998 | Raith et al. .................. 455/574 |
| 5,859,879 | A | * | 1/1999 | Bolgiano et al. ........... 375/347 |
| 5,875,181 | A | * | 2/1999 | Hsu et al. .................... 370/320 |
| 5,909,469 | A | * | 6/1999 | Frodigh et al. ............. 370/465 |

FOREIGN PATENT DOCUMENTS

| EP | 0353759 A2 | 2/1990 | ............ H04B/7/26 |
| EP | 0472511 A2 | 2/1992 | ............ H04Q/7/04 |
| EP | 0713300 A1 | 5/1996 | ............ H04B/7/005 |
| GB | 2313254 A1 | 11/1997 | ............ H04B/7/005 |
| WO | WO9526613 | 10/1995 | |

OTHER PUBLICATIONS

Norihiko Morinaga et al, "New Concepts and Technologies for Achieving Highly Reliable and High–Capacity Multimedia Wireless Communications Systems" IEEE Communications Magazine, Jan. 1997, pp. 34–40.

* cited by examiner

Primary Examiner—Alpus H. Hsu
(74) Attorney, Agent, or Firm—Dicran Halajian

(57) ABSTRACT

A flexible two-way telecommunications system is disclosed having geographically distributed primary stations whose coverage areas define contiguous cells. Secondary stations are capable of roaming between and within the coverage areas of the primary stations. Downlink communications from the primary stations use TDMA transmission and uplink transmissions from the secondary stations use CDMA/TDMA transmissions. Data packets transmitted on the downlink are modulated to suit the quality of the link between the primary station and the addressed secondary station. A header applied to the downlink transmission includes information about the location of the respective data packets relative to a reference point and the modulation scheme applied to each data packet.

22 Claims, 5 Drawing Sheets

FLEXIBLE TWO-WAY TELECOMMUNICATION SYSTEM

The present invention relates to a flexible two-way telecommunication system, particularly, but not exclusively, to a cellular radio system such as a Universal Mobile Telephone System (UMTS).

A radio interface for UMTS is still at the conceptual stage but system designers are now beginning to specify a number of requirements, for example the ability to support a wide range of bit rates (8 kbps–2 Mbps) with high spectral efficiency are two of the most important. Other aspects which will have to be addressed are the flexible deployment of base-stations with the minimum of frequency planning, and the need to support real time services.

The radio interface should provide sufficient frequency diversity to mitigate the effects of multi-path propagation. Time diversity could be used but this is not very effective for stationary or slow moving terminals. Antenna diversity may also be employed, particularly at base stations.

Possible techniques include frequency hopping or broadband modulation. In the latter case a single broadband carrier would require the use of an equaliser at the receiver. Direct Sequence Spread Spectrum or Multi-Carrier Modulation could also be applied, requiring a Rake receiver or FFT demodulator respectively.

Norihiko Morinaga et al in an article entitled "New Concepts and Technologies for Achieving Highly Reliable and High-Capacity Multimedia Wireless Communications Systems" IEEE Communications Magazine, January 1997, pages 34 to 40, discuss the requirement for a highly reliable and a high capacity digital system for use as the third or fourth generation of mobile cellular telecommunications. In particular the merits of system design concepts and techniques for achieving highly reliable and high-capacity multimedia wireless communications using time division multiple access (TDMA) and code division multiple access (CDMA) systems are discussed. With respect to TDMA, this article proposes that a TDMA—based adaptive modulation with dynamic channel assignment is effective to achieve a high capacity microcellular system. The authors remark that broad bandwidth CDMA presents problems of severe inter-chip interference and of synchronisation at the receiver. As a consequence they examine slow frequency and OFDM (orthogonal frequency division multiplex) spread spectrum systems and remark that they will be a candidate for high rate transmissions in submillimeter—or millimeter—wave transmissions. Multicarrier CDMA systems are also considered but the conclusion was reached that single carrier CDMA systems were preferable. This article does not disclose how a flexible system using TDMA and CDMA techniques may be implemented.

An object of the present invention is to optimise the method of transmission of a signal to the conditions surrounding the receiving environment.

According to one aspect of the present invention there is provided a method of transmitting a signal between a primary station and a secondary station, each said station comprising transceiving means and control means, at least the control means of the primary station being capable of determining the quality of a signal received on an uplink, characterised by modulating a signal to be transmitted on a downlink and by selecting the characteristics of the transmission in response to information concerning the quality of the uplink and/or downlink.

According to another aspect of the present invention there is provided a two-way telecommunications system comprising a primary station and at least one secondary station comprising transceiving means, the primary station comprising transmitting means for transmitting signals on a downlink, receiving means for receiving signals transmitted by the transceiving means of the secondary station on an uplink and control means, said control means including means for determining the quality of a signal received by the receiving means from the uplink and means for modulating a signal to be transmitted on the downlink, said modulating means selecting the characteristics of the uplink and/or downlink transmission in response to information obtained concerning the quality of the uplink and/or downlink.

Other factors which may be taken into account when selecting the said characteristics include application requirements such as bit rate, bit error rate (BER) and end-to-end delay.

The present invention will now be described, by way of example, with reference to the accompanying drawings, wherein:

In the drawings corresponding features have been indicated with the same reference numbers.

FIG. 1 illustrates a cellular radio system which operates in accordance with a flexible protocol which is able to support efficiently a wide range of multimedia applications with different bit rates in a wide range of operating conditions on the air interface.

The illustrated system comprises a system controller SC which is coupled by say landlines LL to respective primary stations PS1, PS2 and PS3. The primary stations PS1, PS2, PS3 comprise transceivers and microcontrollers, the transmitter of each of which transceivers defines its own coverage area CA1, CA2 and CA3 which for convenience is shown as hexagonal. In order to allow flexible deployment of the primary stations it is desirable to be able to re-use the same carrier frequency in immediately adjacent coverage areas or cells. Mobile, for example portable, secondary stations SS1, SS2 and SS3 comprising transceivers and microcontrollers are able to roam between and within the coverage areas CA1, CA2 and CA3.

Transmissions on a down-link from a primary station are in the form of a broadband TDMA downlink transmission, the transmitted modulation and coding being selected according to the interference environment at the secondary station being addressed. In the case of uplink transmissions from the secondary stations SS1 and SS3 they may comprise CDMA and TDMA transmissions.

In order to provide flexibility, the broadband TDMA downlink comprises different modulation and coding schemes, nominally of the same bandwidth, but without the constraint of fixed time slots within a time frame. A frame header is used to indicate the location of data intended for each user within the frames. In the case of an uplink transmission, a framing structure is used and the frame is partitioned between CDMA and TDMA sections and in order to allocate secondary stations to parts of the uplink frame, this allocation is indicated in the downlink information.

Time Division Duplex (TDD) and Frequency Division Duplex (FDD) are both possible. In TDD, the durations of uplink and downlink frames could be different. Further the frame duration might not need to be fixed precisely, but could vary around some nominal value (cf IEEE 1394 standard).

In order to maximise data throughput, transmissions to secondary stations which are close to a primary station use a high order modulation but for secondary stations operating under very poor signal-to-noise conditions, such as may occur near the boundary of a cell, low bit rate orthogonal coding may be used. The C/N (Carrier to Noise) requirements for some known modulation schemes with AWGN are tabulated below. In the table Eb/No indicates energy per bit divided by noise density and Bps/Hz indicates bits per second divided by frequency.

| Modulation | Eb/No (dB) | Bps/Hz | C/N (dB) |
| --- | --- | --- | --- |
| 64-QAM | 18 | 6 | 26 |
| 16-QAM | 13 | 4 | 19 |
| 4-QAM/4-PSK | 9 | 2 | 12 |
| 2-PSK | 9 | 1 | 9 |
| 8-FSK | 8 | 0.75 | 7 |
| 16-FSK | 7 | 0.5 | 4 |
| 32-FSK | 6.5 | 0.31 | 1.5 |
| 64-FSK | 6 | 0.19 | −1 |
| 128-FSK | 6 | 0.11 | −3.5 |
| 2-PSK, spread by 9 | 9 | 0.11 | −0.5 |

The results assume coherent detection and could be improved using channel coding in combination with a selected modulation scheme.

Figure 2:
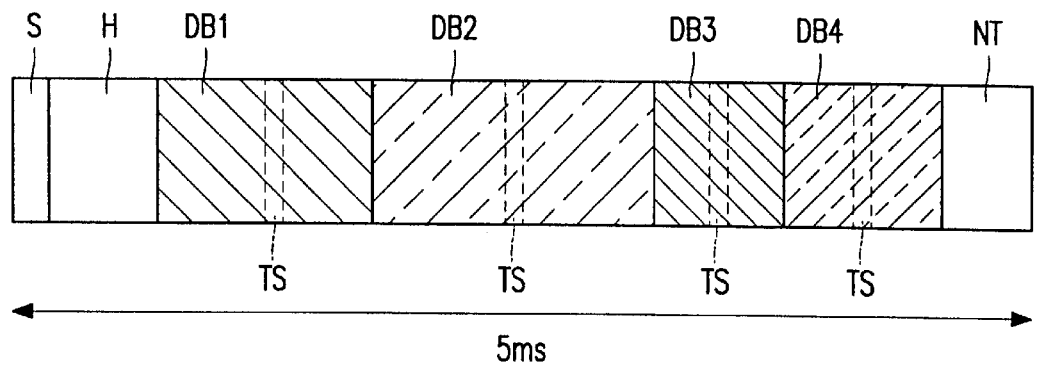
FIG. 2 illustrates an example of a downlink frame structure.

FIG. 2 illustrates an example of a TDMA frame structure suitable for use on the downlink transmission from a primary station. The frame structure comprises a plurality of frames, each being of the same duration, for example 5 ms which is a good compromise between efficiency and transmission delay. The downlink frame comprises a sync sequence S indicating the start of the frame, a header H, followed by one or more data bursts DB1 to DB4 and possibly a null transmission NT until the start of the next frame. The format of each data burst (e.g modulation and coding, training sequences, data organisation) is flexible. The header H contains an indication of the formats and timing of each data burst together with some information on the location of users data within the data bursts. The allocation of user data to data bursts is negotiated between the primary station and the secondary station. Training sequences TS may be embedded in the data bursts to enable the secondary station to estimate the channel characteristics. The distribution of training sequences within the frame need not necessarily be uniform and could be adaptive to the velocity of a secondary station. A rapidly moving secondary station will experience faster changes in the channel and consequently need more rapid updating of the channel impulse response. Slow moving mobiles, particularly at long range, may be able to use several training sequences to get a better estimate of channel impulse response. For optimum efficiency the data bursts are contiguous. Also the sync sequence S could be used as a training sequence.

The requirements of the header are to enable the mobile to efficiently locate its data within the frame while minimising the transmission overhead. Some example header formats are detailed later.

Since the format of the header H is flexible, both traffic and signalling channels can be easily mapped into the same physical radio channels.

A data burst for each secondary station is transmitted within a particular designated time interval with a modulation scheme and power level such that the required number of bits are sent within the frame duration and can be reliably received by the secondary station (considering the prevailing interference environment).

For example, signals intended for secondary stations close to the primary station (experiencing low co-channel interference from adjacent cells) could use a high order modulation (e.g 16-QAM), while for those further away QPSK might be appropriate. For secondary stations at the cell boundary experiencing significant co-channel interference a robust modulation of low bandwidth efficiency might be necessary (e.g 128-FSK).

The header H is used to indicate the location within the frame of data intended for particular users. It could also indicate the quantity of data and modulation scheme. In a downlink scenario the allocation of data within the frame can be completely flexible.

As an example, for mobile radio applications, the bandwidth of the transmission from a primary station could be around 1.5 MHz, with a frame duration of around 5 ms. A wider bandwidth would offer greater benefits from frequency diversity, but the processing requirements of the secondary station's receiver would be correspondingly greater. In order to simplify dynamic channel allocation, it is desirable that the modulation bandwidth is kept constant, but this is not essential.

As a general principle it would be desirable to minimise the peak transmitted power level to minimise interference to other users. So, given the required quantity of data to be sent and the interference levels at each secondary station, the aim is to select a modulation and bit rate for each secondary station such that the transmission occupies the whole frame duration with a uniform minimum power level (or at least a close approximation to this condition). As an example, if just a single low bit-rate user was being served by the primary station this condition would be met by selecting a low order modulation scheme and transmitting for the entire duration of the frame.

When selecting a modulation scheme (including multicarrier and spread spectrum) account must be taken of constraints imposed by for example channel characteristics, transmitter and receiver processing power, transmitter linearity and adjacent channel emissions. The modulation scheme and transmission power can vary dynamically from user to user and from frame to frame. If conventional spreading techniques are used, then more than one user may be supported in the same time-slot.

Since some of the information in the header H will be required by distant secondary stations it will need to be robustly transmitted, with significant redundancy. A solution which reduces the total redundancy is to partition the header blocks with differing levels of coding (or modulation). Two partitions are probably sufficient, where modulation schemes are referred to in one of the partitions (but not both). It may be desirable for the header H to include a length indicator and some error detection, such as CRC.

Figure 3:
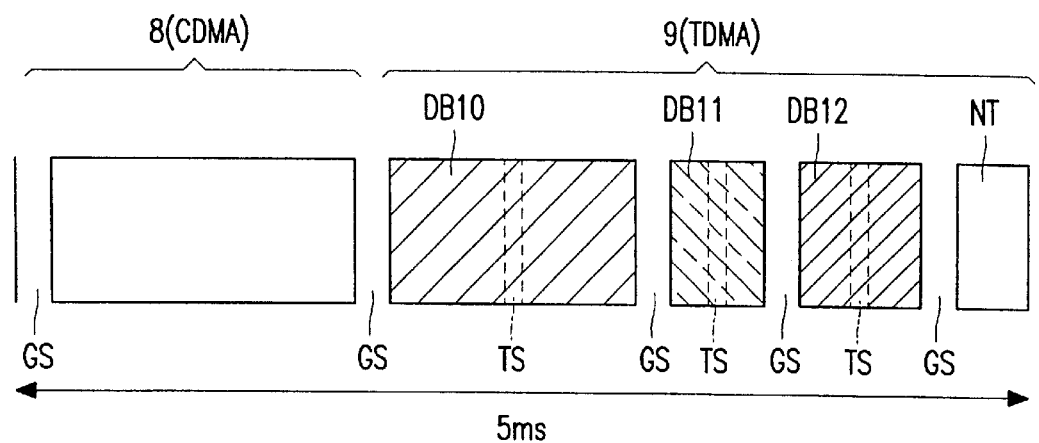
FIG. 3 illustrates an example of an uplink frame structure.

FIG. 3 illustrates an example of an uplink frame structure. An exclusively TDMA structure is possible, but not considered practical for uplink transmissions because for high efficiency the secondary stations would be required to achieve high timing accuracy. A CDMA approach has the desirable feature that efficient variable rate communication is possible. In addition the receiver complexity, which could be considerable if multi-user detection is used, is located at the primary station. However, for very high bit rates and correspondingly large packet sizes, better performance (with lower complexity) may be obtained by using part of the frame in a TDMA mode.

FIG. 3 shows a split of resources in the uplink frame structure between CDMA section 8 and TDMA section 9. More particularly the duration of the uplink frame is the same as the downlink frame, say 5 ms. The frame commences with a guard space GS and is followed by the CDMA section 8. Three data bursts DB10, DB11, DB12 are included in the frame and are separated from each other and the CDMA section 8 by guard spaces GS. A null transmission section NT may be included to complete the frame. The precise allocation can be indicated in the downlink, for example in the frame header or via control channels. Likewise timing can be derived from the downlink.

The format of the uplink bursts must be agreed by secondary station and the primary station during call set up. This signalling could be carried out using the CDMA section 8. The division between the CDMA and the TDMA sections 8,9 may be determined dynamically in which case the downlink header will contain an indication of the location of the division. The TDMA section 9 is composed of data bursts DB10, DB11, DB12 from three users as indicated by the different hatching patterns. Each of the data bursts DB10, DB11 and DB12 may include at least one training sequence TS located intermediate the start and finish of the data burst. The number of training sequences allocated per packet is determined by the need to be able to track channel changes. Power control is applied to the CDMA section 8 of the uplink transmission and may be applied to the transmission of the data bursts DB10, DB11, DB12 in order to minimise adjacent channel interference. In the event of the frame not being filled completely by data bursts, a null transmission NT is made to complete the frame.

Similar principles can be used in sending data packets on the uplink as are used on the downlink but some additional features are necessary.

Variable bit-rate real time services, where access to the channel is needed without prior reservation, can be efficiently supported by CDMA techniques, and section 8 of the frame is allocated to use of this access mechanism. Multi-carrier CDMA could also be appropriate. One requirement may be to use sufficient bandwidth to obtain the benefits of frequency diversity. However, primary stations may also be able to exploit antenna diversity. Low bit-rate non-real time services may also be allocated to this portion of the frame, since the overheads associated with packet transmission (training sequence and guard space) may be significant.

High bit-rate packets can be more efficiently transmitted by TDMA, particularly if the secondary station is close to the primary station. Therefore section 9 of the frame is allocated to use of this access mechanism. In this case guard spaces GS are provided in front of the CDMA section 8 and between the section 8, data bursts DB10, DB11 and DB12 and, if present, the null transmission NT in order to make allowance for timing errors by the secondary stations. The duration of the guard space GS may be adaptive, depending on the size of the coverage area. Permission to transmit a data burst at a given time may be granted by the primary station.

The timing of the uplink frame can be derived from the downlink sync sequence S. Timing advance may be desirable in large cells.

Figure 4:
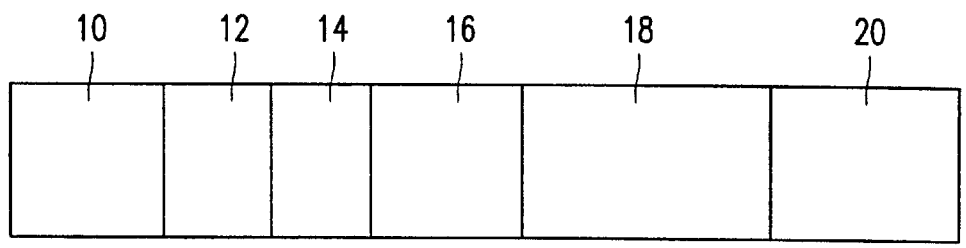
FIG. 4 illustrates an example of the downlink header structure.

An example of a downlink header structure will now be described with reference to FIG. 4. The header structure comprises 6 concatenated fields 10 to 20, each field serves for indicating field sizes 10, that is, the sizes of the fields 12, 14, 16 and 20, number of bursts 12, number of addresses 14 in a frame, number of addresses in each burst 16, the addresses in each burst 18 and the timing offset of each burst 20, respectively. The appended frame is organised such that data packets using the same modulation/coding scheme are transmitted together in the same data burst. By the field 18 listing the destination addresses for the packets in each burst (for convenience in the order in which they are transmitted) and the field 20 giving the timing offset of the start of each data burst, a user can determine if there is a relevant data packet in the frame, and in which data burst it is located.

The allocation of Temporary Addresses and agreement on Burst Formats can be established at Registration or Call Set Up, or changed by signalling.

| Parameter Description | Units | Designation | Number of Bits |
|---|---|---|---|
| Size of Temporary Address Field | Bits | STAF | 4 |
| Size of Number of Bursts Field | Bits | SNBF | 3 |
| Size of Number of Packets Field | Bits | SNPF | 4 |
| Size of Timing Offset Field | Bits | STOF | 4 |
| Number of Bursts | Number | NB | SNBF |
| Number of Temporary Addresses with Data Packets in Current Frame | Number | NTA | STAF |
| List of Number of Temporary Addresses with Data Packets in each Burst | List of numbers | | NB*SNPF |
| List of Temporary Addresses with Data Packets in each Burst | List of addresses | | NTA*STAF |
| Timing Offset of each Burst | List of Offsets | | NB*STOF |

The sizes of all the fields are adjustable over wide limits to allow the greatest possible degree of flexibility.

If some typical figures are taken as an example, for a frame duration of 5 ms with a nominal throughput capability of 1 Mbps, then the frame will consist of a maximum of 5000 bits. If the number of Temporary Addresses is 200, then STAF=8. If the minimum packet size is 3 bytes, then the maximum number of packets is about 200 and SNPF=8. If the timing resolution is specified as 1 part in 4096, then STOF=12. If the Number of Bursts is 6, then SNBF=3.

Taking a typical case of 20 data packets in a frame, this means that the total number of bits in the header is 4+3+4+4+3+8+(6*8)+(20*8)+(6*12)=306 bits which is an overhead of about 6%. The overhead due to the header is thus about 2 bytes per packet.

A Burst Identifier is implicitly assigned to each data burst, and they are transmitted in ascending order. Not all bursts need to be transmitted. An untransmitted burst will have no Temporary Address assigned to it in the header.

Further simplification is possible. For example the Number of Temporary Addresses with Data Packets in the Current Frame could be deduced by summation of the number of packets in each data burst.

The allocation of burst format to each burst (e.g. modulation, coding, structure) can be dynamic. The details could be communicated to a mobile on registration, at call set up or by signalling.

It is probably desirable to standardise the formats of some burst (e.g for broadcast channels).

In some applications it may be desirable to allocate the same burst format to more than one data burst.

The structure of downlink data bursts is flexible. Therefore any format could be defined, subject to the system bandwidth constraints. Two possibilities optimised for non-real time packet transmission and very low rate variable real-time transmission, respectively, will now be considered.

Figure 5:
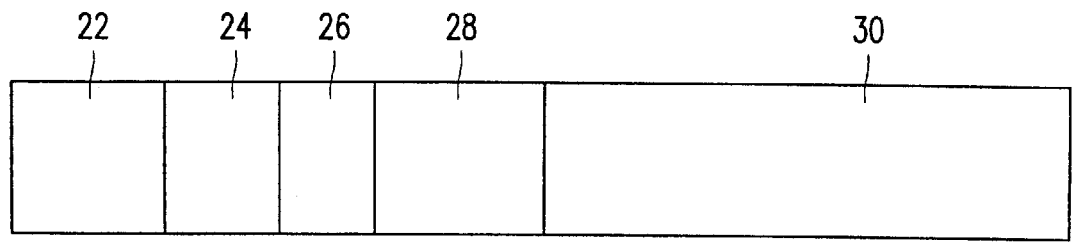
FIG. 5 illustrates an example of a downlink packet data burst structure.

The data burst structure shown in FIG. 5 comprises 5 concatenated fields commencing with a training sequence 22 and followed by field sizes 24, number of packets 26, packet sizes 28 and the packets 30 themselves. The following table gives an example of implementing a packet data burst.

| Parameter Description | Units | Designation | Number of Bits |
|---|---|---|---|
| Training Sequence | Bits | TS | 40 |
| Size of Number of Packets Field | Bits | SMPF | 4 |
| Size of Packet Size Field | Bits | SPSF | 4 |
| Number of Packets | Number | NP | SNPF |
| List of Packet Sizes (in bytes) | List | | NP*SPSF |
| Packets | Data | | up to NP*$2^{SPSF}$*8 |

This packet format could be used when only one training sequence is required. It also assumes that all the relevant destination addresses are given in the Frame Header. The length of the training sequence given here is only illustrative.

Let us assume that the data burst contains 5 packets of average size 20 bytes and maximum size 50 bytes. Then SNPF=3, SPSF=6, NP=5 and the overhead (without training sequence) is 4+4+3+(5*6)=45 bits which, given the size of packet data of 5*20*8=800 bits, represents an overhead of about 6%, or about 1 byte per packet.

For low bit rate speech, with a bit rate of 8 kbps, the typical packet size would be 5 bytes. The overhead considering both frame header and burst structure is about 3 bytes per packet (or 60%).

Figure 6:
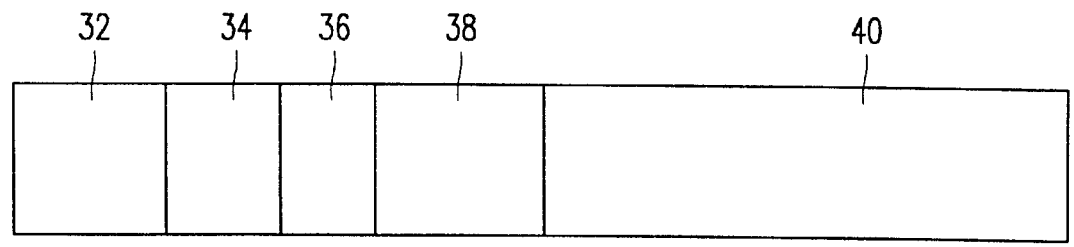
FIG. 6 illustrates an example of a downlink real-time data burst structure.

FIG. 6 illustrates an example of a downlink real-time data burst structure which commences with a training sequence 32 which is followed by field sizes 34, size of address map 36, the address map 38 and the data bytes 40. The following table gives an example of implementing a downlink real-time data burst structure.

| Parameter Description | Units | Designation | Number of Bits |
|---|---|---|---|
| Training Sequence | Bits | TS | 40 |
| Size of Number of Bytes Field | Bits | SNBF | 4 |
| Size of Address Map | Bits | SAM | SNBF |
| Address Map | Bit Map | | SAM |
| Data Bytes | Data | | up to SAM*8 |

This burst is designed to be efficient for circuit switched (connection oriented) low bit rate real time traffic which may also have variable bit rate and variable occupancy. The data from several users is multiplexed in the packet. To save space in the frame header, only one Temporary Address is assigned to be used by all the users. On call set up the user is informed of the relevant Temporary Address and assigned one or more bytes in the burst, each designated by a location in the Address Map. To deal with variable bit rates, bytes are only transmitted in the frame when there is data from the signal source. In this case the corresponding bit in the Address Map is set. Otherwise the bit in the Address Map is not set and that byte is not transmitted. The user can thus identify whether relevant data is present by examining their allocated locations in the Address Map.

As an example, it will be assumed that there are 40 users which have each been assigned 6 bytes of capacity in the burst, but the signal source is only 50% active. With a frame duration of 5 ms this corresponds to an active bit rate of 9600 bps, which may be appropriate for low rate speech services. Then SNBF=8, SAM=240 which is an overhead (without training sequence) of 4+8+240=252 bits. The average packet will contain 960 bits, so the overhead represents about 26% of the data throughput. The efficiency could be improved significantly by changing the granularity of the capacity allocation to match the signal source (e.g to 3 bytes instead of 1 byte).

For fixed rate low bit rate services the Address Map would not be required and as a consequence the efficiency could be higher.

Figure 7:
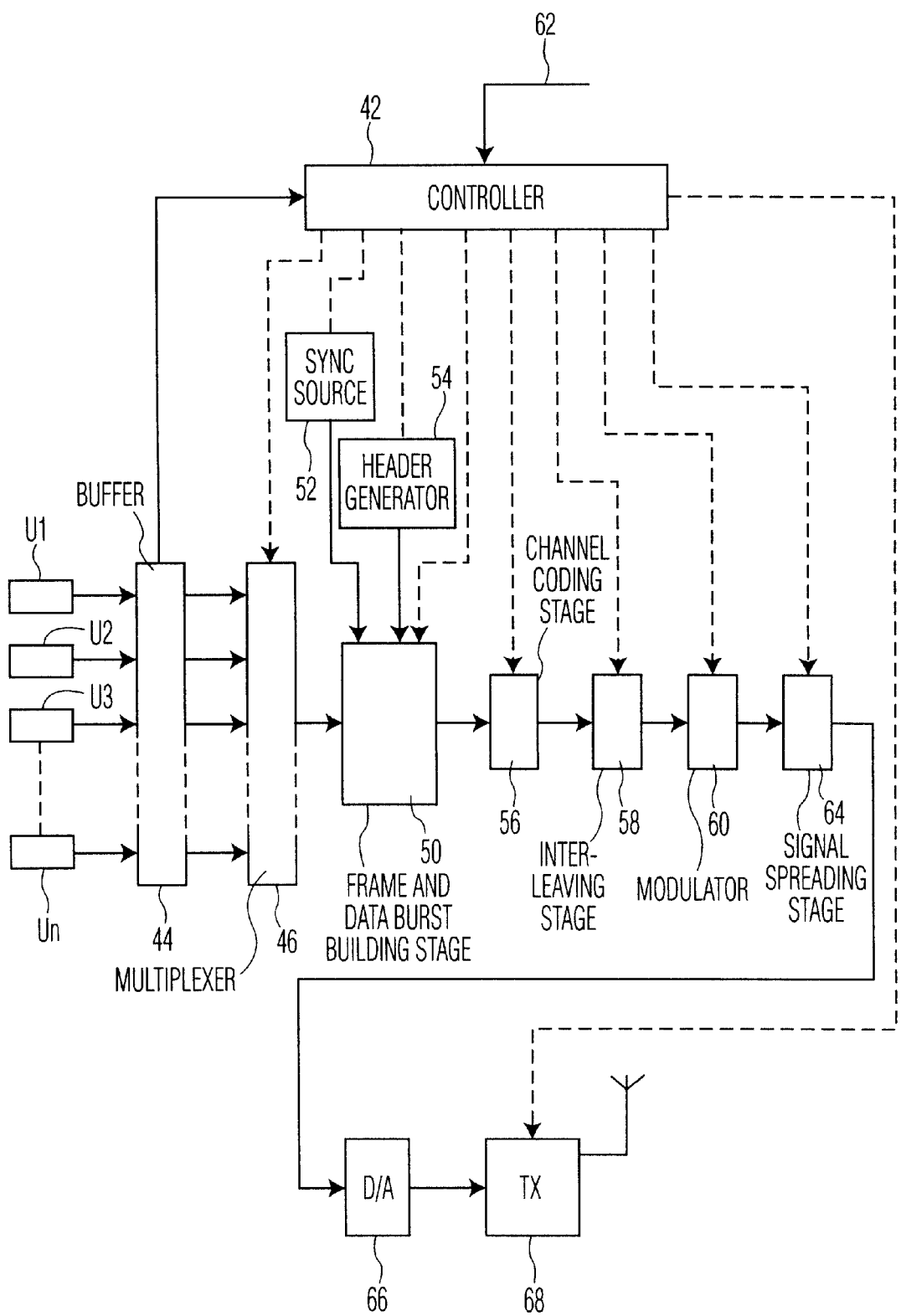
FIG. 7 is a block schematic diagram of a transmitter which can be used in a primary and a secondary station.
Figure 8:
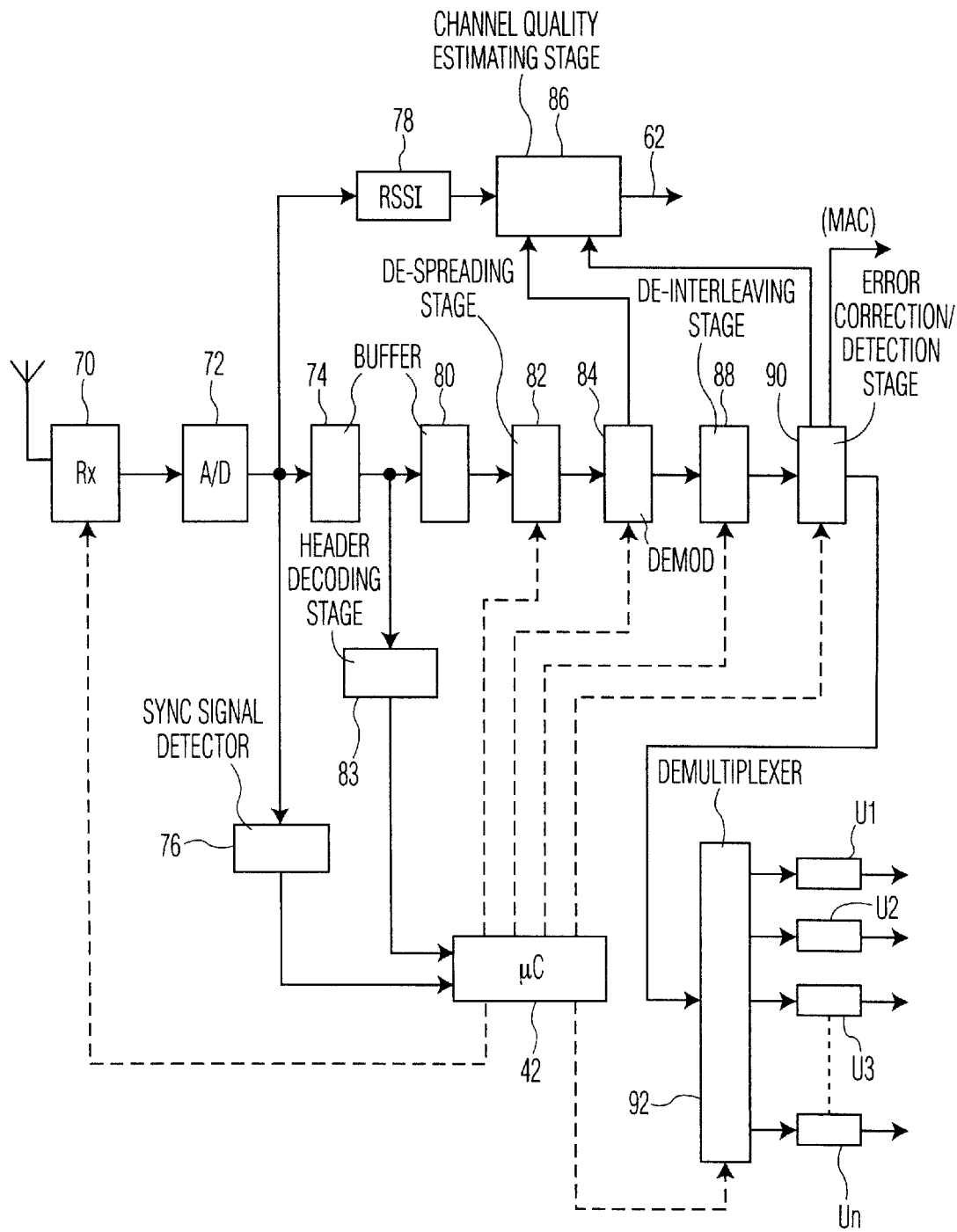
FIG. 8 is a block schematic diagram of a receiver which can be used in a primary and a secondary station.

FIGS. 7 and 8 are block schematic diagrams of a transmitter, receiver and controller as embodied in a primary station. The secondary station could be similar but omit those features relating to handling inputs from, and outputs to, a multiplicity of users. For convenience of description, the transmitter and receiver have been shown separately. However, in reality certain parts, such as controller 42 and frequency generators (not shown separately), will be common and identified by the same reference number.

Referring to FIG. 7, different users or different applications run by one user U1, U2, U3 to Un are coupled to a buffer 44. The users U1 to Un provide digital outputs. Outputs of the buffer 44 are coupled to multiplexer 46. Information concerning the user data is relayed to the controller 42 by a line 48. An output from the multiplexer 46 is coupled to a frame/data burst building stage 50 which also receives inputs from a sync source 52 and a header generator 54. The frame/data burst is supplied to a channel coding stage 56 for encoding. If it is decided that the channel coded signal should be interleaved then this is done in an interleaving stage 58. The signal is then modulated in a modulator 60. The modulation scheme(s) used on the signal(s) is determined by the controller 42 which on an input 62 from the receiver (FIG. 8) receives estimates of the channel quality to each of the respective addressees of signals. Stage 64 is a signal spreading stage whose use is optional. The modulated signal is converted into an analogue signal in a digital to analogue converter 66 and is passed to a transmitter 68. Although not shown, the block representing the transmitter 68 includes a master oscillator and mixer for frequency up-conversion and a power amplifier.

The broken lines represent control lines from the controller 42 to the stages 46, 50, 52, 54, 56, 58, 60, 64 and 68, respectively.

The receiver shown in FIG. 8 comprises a receiving stage 70, which includes amplifiers, local oscillator, mixer and filters (not shown), coupled to an analogue to digital converter 72. The digitised output is supplied to a buffer 74, a sync signal detector 76 and to a RSSI stage 78. An output of the buffer 74 is supplied to another buffer 80 and to a header decoding stage 83. The outputs of the sync signal detector 76 and the header decoding stage 83 are coupled to the controller 42 which recovers the information in the header and uses it in controlling various stages of the receiver. If the received signal is a CDMA signal then it is de-spread in a de-spreading stage 82. A demodulator 84 demodulates a signal on its input using a modulation scheme selected by the controller 42 in response to data in the header. The demodulator 84 provides outputs to a channel quality estimating stage 86 and an optional de-interleaving stage 88.

Any error correction/detection of the demodulated signal is carried out in error correction/detection stage 90 which supplies an output to a demultiplexer 92 to which are connected the users or different applications of one user U1 to Un. The error correction/detection stage 90 also provides an output to the stage 86 and an error indication to the medium access control (MAC) layer.

The stage 86 uses the outputs from the RSSI stage 78, the demodulator 84 and the error correction/detection stage 90 to make an estimate of the channel quality and to supply this estimate on the line 62 coupled to the controller 42 of the transmitter (FIG. 7).

On the basis of the information given in the header, power saving can be practised by the transceiver. In use the controller 42 can energise the receiver to receive the sync signal and header in each frame and if it determines that there are no data bursts for it, various stages of the receiver can be de-energised or put into a sleep mode. Additionally by analysing the information in the header, the controller 42 may determine that say the third one of five data bursts in the frame is addressed to it and in consequence it de-energises or puts into a sleep mode various stages of the receiver for substantially the durations of the first second, fourth and fifth data bursts. In another variant applicable to a low rate data user/application, the primary station and an addressed secondary station can arrange for data to be transmitted every 1 in N frames, where N is an integer, so that the receiver can sleep for the intervening (N−1) frames.

Other features of implementing the system in accordance with the present invention are:

The same frame structure can be used in both time division duplex (TDD) and frequency division duplex (FDD) modes. Timing can be derived from the downlink sync sequence. In the case of TDD the partitioning between uplink and downlink could be variable.

In typical operating environments with frequency selective fading, a wide bandwidth is desirable in order to obtain the benefits of frequency diversity. Possible solutions are: single broadband carrier with equalisation at the receiver, multi-carrier modulation (MCM); direct sequence spread spectrum (DSSS). These have the advantage of reducing the need for time domain interleaving. Slow frequency hopping is another option, but this is likely to imply significant interleaving delay.

Using a single carrier approach, a carrier spacing of the order of 1.6 MHz would be viable. If MCM techniques are adopted, then the effective bandwidth would be much wider.

The frequency re-use distance should be chosen to maximise spectral efficiency. One possible solution for the downlink might be to use DSSS techniques with re-use in adjacent cells (cluster size=1). Another approach is to accept the possible loss in capacity due to a larger re-use distance, in order to obtain higher throughput from a single carrier.

The system capacity can be increased by adapting the modulation scheme to the channel conditions. For example, high order modulations (e.g 16-QAM) could be used on the downlink for transmission to secondary stations near the primary station, where C/I is relatively good. Similarly, robust modulation (e.g BPSK) and coding schemes can be used to reach mobiles near the edge of the cell where C/I is poor.

If interleaving is required, then data bursts can be defined where the interleaving depth can in principle be any combination of the following:

within a burst;
over more than one burst in a frame;
over more than one frame.

For flexible deployment dynamic channel allocation (DCA) is desirable.

Two different handover types are considered:

Intra-cell (to a different downlink burst, or from CDMA to TDMA sections in uplink). This is straightforward, and a downlink handover may not even need any signalling between mobile and base-station, since the change can be indicated in the frame header.

Inter-cell (to a different carrier frequency, or possibly the same one if spreading is used). A mechanism is proposed below for inter-cell handover, which does not require two transmitters or receivers. When a secondary station is in a situation where an inter-cell handover is likely transmissions (on both uplink and downlink) are limited to alternate frames. This would simplify monitoring signals from other primary stations without the need for two receivers. It would also allow communication to be established with two base stations at once (allowing "soft handover").

Furthermore, if the calls where a handover is expected (i.e with secondary stations near the cell boundary, and therefore using a low order robust modulation) are placed on a downlink transmission burst closely following the header in time, then handovers can be carried out between unsynchronised primary stations, since the probability of overlap between required parts of the downlink frames are minimised. Distance from secondary to primary station can be determined (at least in a relative way) if both transmitted and receiver power levels are known. The proposed uplink frame also supports this handover feature.

Power control can be applied in both the uplink and downlink. In the uplink, the power of the secondary station should be adjusted to achieve sufficient C/I at the primary station. In the downlink, the choice of modulation scheme, burst format and power level can be made to minimise interference to other users, while still achieving a good quality connection. A uniform power level throughout the frame is a reasonable objective here.

On the downlink data for low bit rate users is allocated close to the header so that their receivers only need to power-up once.

Dynamic Channel Allocation DCA can be applied, particularly to ease handover problems for roaming secondary stations at cell boundaries. To allow a secondary station at a cell boundary to distinguish signals from different primary stations, it will be desirable to use different orthogonal codes. This could be achieved by use of different spreading codes. Allocation on a random basis may be sufficient. A secondary station may be able to detect codes used by a neighbouring primary station and request the use of a different one.

Figure 1:
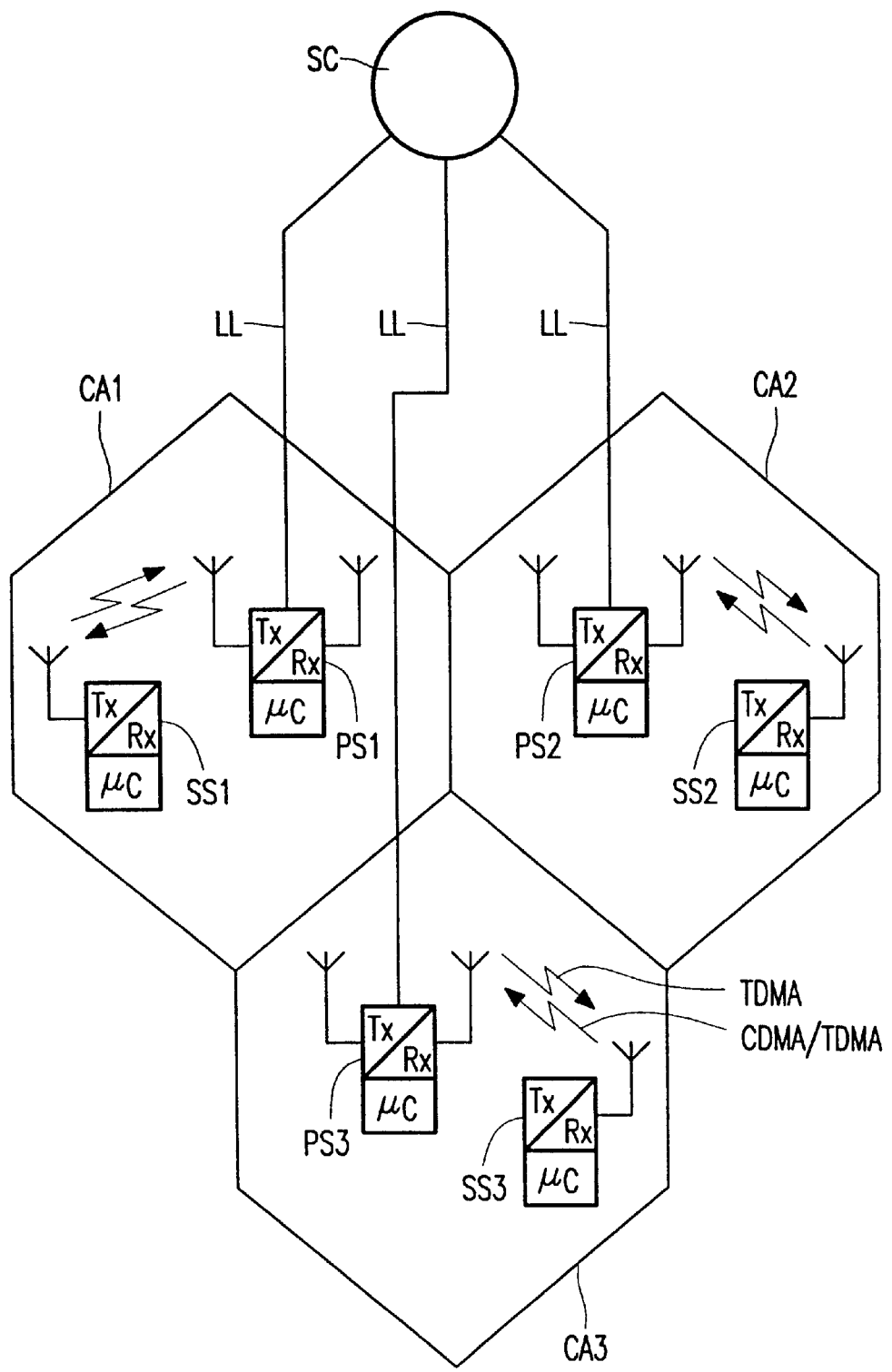
FIG. 1 is a block schematic diagram of two-way telecommunications system.

When setting-up a cell, the secondary station will need to inform the primary station of its current radio environment (i.e. interference levels in possible channels, velocity-if known). The primary station will also need to know the path loss to the secondary station, which might be inferred from received level on the up-link if the transmit power is known. There will also need to be an agreement between the secondary station and primary station on their respective capabilities (e.g bit rate, modulation, coding). Such information may be pre-stored in the system controller SC (FIG. 1).

The data for a particular user could be identified by time in relation to the start or finish of the header. Sync sequences might help, for example if they are regularly spaced. Some sync/address data might be included in the user data to allow for small timing errors.

Control and signalling information may be placed in the header, or in separate time slots.

From reading the present disclosure, other modifications will be apparent to persons skilled in the art. Such modifications may involve other features which are already known in the design, manufacture and use of telecommunications systems and component parts thereof and which may be used instead of or in addition to features already described herein.

What is claimed is:

1. A method for transmitting and receiving signals between a primary station and a plurality of secondary stations in a single downlink frame, said method comprising the steps of:
   a) receiving first signals at said primary station from said secondary stations on an uplink;
   b) estimating the quality of each of said received uplink signals at said primary station;
   c) individually selecting modulation and coding schemes at said primary station in accordance with said estimated signals received on said uplinks for each of said secondary stations;
   d) modulating second signals according to selected modulation and coding schemes for each of said secondary stations; and
   e) transmitting said selectively modulated and coded second signals to each of said secondary stations on a single downlink frame, said downlink frame including a frame structure having a header for said frame and a data burst for each modulated second signal for each secondary station, said header providing information enabling each secondary station to locate its respective data burst within the frame structure.

2. A method as claimed in claim 1, wherein said estimating step includes selecting said modulation and coding schemes on the basis of at least one of the following:
   received signal strength indication;
   bit rate;
   bit error rate; and
   end-to-end delay.

3. A method as claimed in claim 1, wherein said transmitting step includes downlink transmissions that comprise time frames, where each time frame includes a header having indicia indicating the transmission characteristics and timing of each data burst in the time frame.

4. A method as claimed in claim 1, wherein said transmitting step includes downlink transmissions that are TDMA.

5. A method as claimed in claim 1, wherein said receiving step includes uplink transmissions that are CDMA and/or TDMA.

6. A two-way telecommunication system including a primary station and at least one secondary station, each station capable of receiving and transmitting signals, said system comprising:
   a) means at said primary station for receiving first signals one or more secondary stations on an uplink;
   b) means for estimating the quality of each of said received first signals at said primary station;
   c) means for individually selecting modulation and coding schemes at said primary station in accordance with said estimated first signals received on said uplink for each of said secondary stations;
   d) means for modulating second signals according to selected modulation and coding schemes for each of said secondary stations; and
   e) means at said primary station for transmitting said selectively modulated and coded second signals to each of said secondary stations on a single downlink frame, said downlink frame including a frame structure having a header for said frame and a data burst for each modulated second signal for each secondary station, said header providing information enabling each secondary station to locate its respective data burst within the frame structure.

7. A system as claimed in claim 6, characterized in that the primary station transmits downlink signals in accordance with a TDMA format comprising a succession of time frame structures, each including said frame header.

8. A system as claimed in claim 7, characterized in that the frame header includes indicia indicating the location of data bursts intended for one or more of the secondary stations.

9. A system as claimed in claim 8, characterized in that the frame header includes indicia indicating the format and timing of each data burst.

10. A system as claimed in claim 8, characterized in that training sequences are embedded in data bursts.

11. A system as claimed in claim 7, characterized in that at least one secondary station effects power saving by adopting a sleep mode whenever the secondary station determined that data bursts are directed to other secondary stations.

12. A system as claimed in claim 7, characterized in that the time frames are of a substantially fixed duration.

13. A system as claimed in claim 6, characterized in that the modulating means applies a high order modulation scheme to signals to be transmitted to secondary stations relatively close to the primary station and low bit rate orthogonal codes when transmitting signals to relatively distant secondary stations.

14. A system as claimed in claim 6, characterized in that traffic data is transmitted on the downlink with a modulation scheme and power level determined to ensure reliable receipt by a secondary station.

15. A system as claimed in claim 6, characterized in that uplink signals are transmitted as CDMA signals.

16. A system as claimed in claim 6, characterized in that uplink signals are transmitted in accordance with a TDMA format.

17. A system as claimed in claim 16, characterized in that TDMA uplink signals comprise at least two data bursts and in that a guard space is provided between adjacent data bursts.

18. A system as claimed in claim 16, characterized in that TDMA uplink signals comprise at least two data bursts, and that each data burst comprises at least one training sequence.

19. A system as claimed in claim 16, characterized in that TDMA uplink signals comprise data packets, and in that the bit rates of at least two of the data packets are different.

20. A system as claimed in claim 6, characterized in that timing for uplink signals is derived from the downlink signals.

21. A system as claimed in claim 6, characterized in that the system is a cellular system comprising a plurality of cells, each cell having a primary station definition a respective coverage area.

22. A system as claimed in claim 21, characterized in that primary stations have means for handing over a secondary station participating in a call from one cell to another cell.

* * * * *